(12) United States Patent
Herz

(10) Patent No.: US 7,831,505 B2
(45) Date of Patent: Nov. 9, 2010

(54) SYSTEM AND METHOD FOR DYNAMICALLY REGULATING ORDER ENTRY IN AN ELECTRONIC TRADING ENVIRONMENT

(75) Inventor: Eric M. Herz, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 12/549,067

(22) Filed: Aug. 27, 2009

(65) Prior Publication Data
US 2009/0319418 A1    Dec. 24, 2009

Related U.S. Application Data

(63) Continuation of application No. 11/095,980, filed on Mar. 31, 2005, now Pat. No. 7,596,528.

(51) Int. Cl.
*G06Q 40/00* (2006.01)
(52) U.S. Cl. .................................................. 705/37
(58) Field of Classification Search ................. 705/37
See application file for complete search history.

(56) References Cited

U.S. PATENT DOCUMENTS

| | | | |
|---|---|---|---|
| 6,418,419 B1 | 7/2002 | Nieboer et al. | |
| 6,772,132 B1 | 8/2004 | Kemp, II et al. | |
| 7,127,424 B2 | 10/2006 | Kemp et al. | |
| 7,155,410 B1 | 12/2006 | Woodmansey et al. | |
| 7,299,208 B1 | 11/2007 | Bailon et al. | |
| 7,389,268 B1 | 6/2008 | Kemp, II et al. | |
| 7,437,325 B2 | 10/2008 | Kemp, II et al. | |
| 2003/0004852 A1 | 1/2003 | Burns | |
| 2003/0130929 A1 | 7/2003 | Waddell | |
| 2003/0154152 A1 | 8/2003 | Gilbert et al. | |
| 2003/0236737 A1 | 12/2003 | Kemp et al. | |
| 2004/0236637 A1 | 11/2004 | Tatge et al. | |
| 2005/0119964 A1 | 6/2005 | Brady et al. | |
| 2007/0038550 A1 | 2/2007 | Caille et al. | |

OTHER PUBLICATIONS

Bourghelle et al.: Why market should not necessarily reduce the tick size, Center de Recherche en Gestion, Oct. 2002, pp. 1-44.*
Taiwan Stock Exchange: Fact Book, Trading Process, 2003, pp. 29-37.*
Unpublished U.S. Appl. No. 11/095,980, filed Mar. 31, 2005 entitled "System and Method for Dynamically Regulating Order Entry in an Electronic Trading Environment".
Gwilym et al.: Extreme Price Clustering in London Equity Futute and Options Market. Journal of Banking and Finance 22, Mar. 1998, pp. 1196-1206.

* cited by examiner

*Primary Examiner*—Hani Kazimi
*Assistant Examiner*—Bijendra K Shrestha
(74) *Attorney, Agent, or Firm*—McDonnell Boehnen Hulbert & Berghoff LLP

(57) ABSTRACT

A system and method are provided for trading a trading strategy defined for at least one tradeable object in an electronic trading environment. More specifically, one example method includes using a first pay-up tick value to determine a first acceptable price level for an order associated with the trading strategy, automatically modifying the first pay-up tick to a second pay-up tick value in response to detecting a predefined condition, and using the second pay-up tick value to determine a second acceptable price level for the order associated with the trading strategy.

18 Claims, 8 Drawing Sheets

FIG. 5

Tradeable Object A

| Bid Qty | Price | Ask Qty |
|---|---|---|
|  | 109310 | 500 |
|  | 109305 | 100 |
|  | 109300 |  |
|  | 109295 |  |
| 500 | 109290 |  |
| 120 | 109285 |  |
| 81 | 109280 |  |

Tradeable Object B

| Bid Qty | Price | Ask Qty |
|---|---|---|
|  | 111280 | 50 |
|  | 111275 | 500 |
|  | 111270 | 100 |
|  | 111265 |  |
| 500 | 111260 |  |
| 158 | 111255 |  |
| 320 | 111250 |  |

| | Spread Configuration Window 600 | | |
|---|---|---|---|
| Spread Name: | TTSIM-D FGBL SEP06 vs. TTSIM-D FGBL DEC06  602 | | OK |
| | Slop 604  Leg Color ID 606  Base Spread On 608 | | |
| Inside: | ● Implied Spread Prices | | Cancel |
| Outside: | ○ Net Change | | |
| | Leg | A | B |
| 610 | Leg | TTSIM-D FGBL SEP06 ▶ | TTSIM-D FGBL DEC06 ▶ |
| 612 | Customer Account | ▶ | ▶ |
| 614 | Active Quoting | ☒ | ☒ |
| 616 | Adjust For Market Depth | ☒ | ☒ |
| 618 | Offset With | Limit Orders ▶ | Limit Orders ▶ |
| 620 | Pay-Up Ticks | Numerical ☐ Conditional ☒ | Numerical ☐ Conditional ☒ |
| 622 | Spread Ratio | 1 | -1 |
| 624 | Spread Multiplier | 1 | -1 |
| 626 | Use Cancel/Replace rather than Change | ☐ | ☐ |
| 628 | Price Reasonability Check in Leg | ☒ | ☒ |

FIG. 6

| Conditional Pay-Up Ticks 702 | | A | B |
|---|---|---|---|
| 702 | Leg | TTSIM-D FGBL SEP06 ▶ | TTSIM-D FGBL DEC06 ▶ |
| 704 | Select Condition | ▶ | ▶ |
| 706 | Create/Modify Condition | ▶ | ▶ |
| 708 | Create/Link Equation | ▶ | ▶ |
| 710 | Quantity Ratio | ⊠ 716  X:Y 718 | ⊠ 720  X:Y 722 |
| 712 | Minimum Quantity | ⊠ 724  X 726 | ⊠ 728  Y 730 |
| 714 | Pay-Up Tick Value | ▶ | ▶ |

FIG. 7

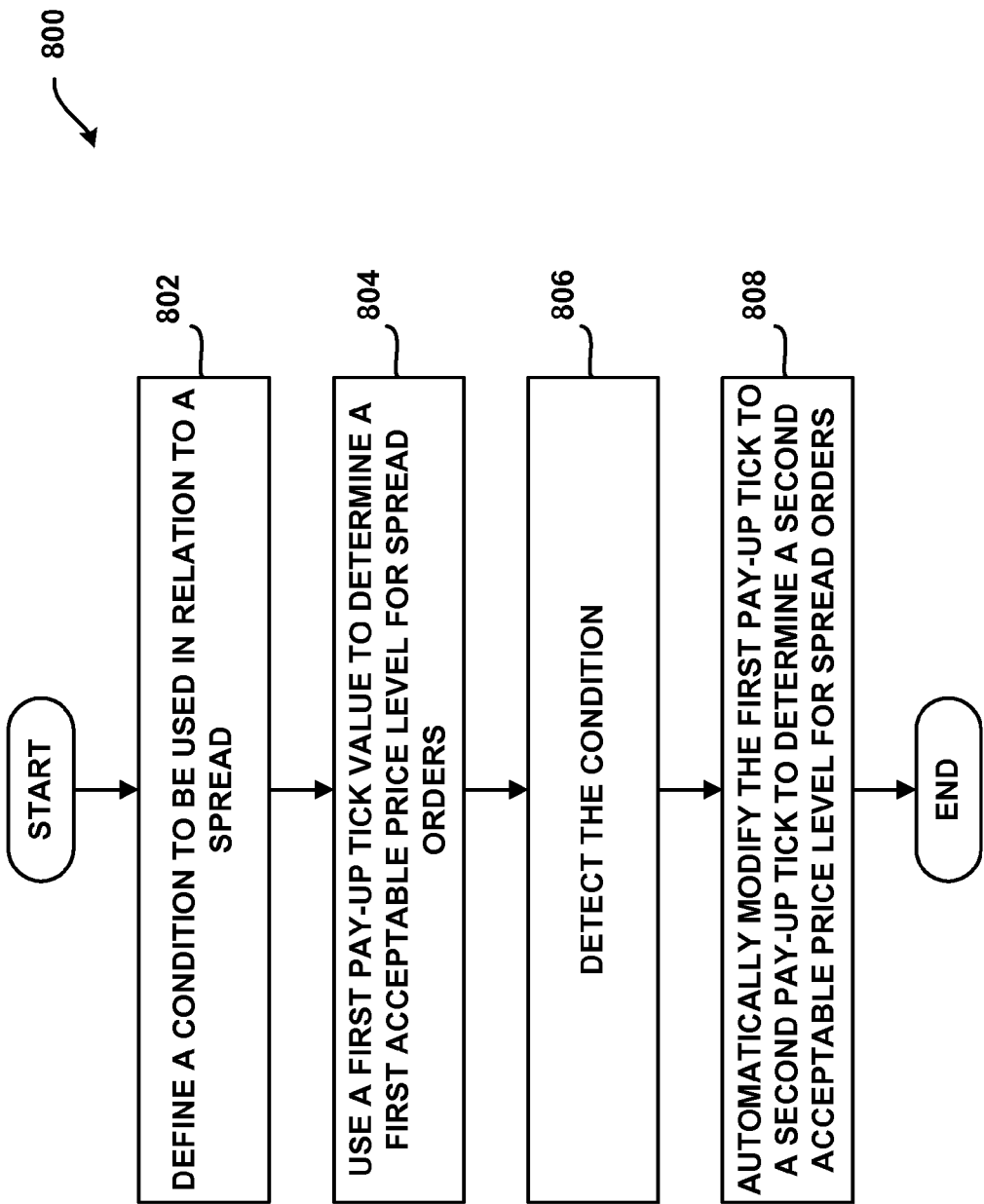

SYSTEM AND METHOD FOR DYNAMICALLY REGULATING ORDER ENTRY IN AN ELECTRONIC TRADING ENVIRONMENT

CROSS-REFERENCE TO RELATED APPLICATIONS

The present application is a continuation of U.S. patent application Ser. No. 11/095,980, filed Mar. 31, 2005, entitled "System and Method for Dynamically Regulating Order Entry in an Electronic Trading Environment".

TECHNICAL FIELD

The present invention is directed to electronic trading. More specifically, the present invention is directed towards dynamically regulating order entry in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks. A client device is a computer such as a personal computer, laptop computer, hand-held computer, and so forth that has network access. A network is a group of two or more computers or devices linked together, which can be characterized by topology, protocol, and architecture. For example, some market participants may link to the host through a direct network connection such as a TI or ISDN. Some participants may link to the host exchange through direct network connections and through other common network components such as high-speed servers, routers, and gateways. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools that automatically or semi-automatically send orders to the exchange. Such trading tools are usually provided to, among other things, facilitate fast and accurate order entry. For instance, an automated tool might quickly calculate one or more order parameters, such as order price or order quantity, based on market conditions, or some other reference condition, and then automatically send an order with these parameters to an exchange for matching. According to many existing and popular exchanges today, orders are electronically entered in an exchange order book in the sequence in which they are entered into the market (a first-in, first-out, commonly referred to as FIFO matching system). Based on this sequence, and the availability of market quantity, orders are filled, with priority given to the first order entered, then the second (next) order entered, and so forth.

Automated or semi-automated trading tools often include spread trading tools. In general, spread trading is the buying and/or selling of one, two or more tradeable objects, the purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

During spread trading, a trader has typically a reason to believe that the conditions that will cause price movements in one tradeable object will also cause price movements in the other. Thus, in other words, spread trading may be thought of as the process of protecting a position where an investment is made, by taking an offsetting position in a related product in order to reduce the risk of adverse price movements. For example, a trader might simultaneously buy and sell two options of the same class at different strike prices and/or expiration dates. Typically, spread trading is used to describe a "short" position taken to offset a "long" position in the market. In other words, when a long position is established with one order, another order, an offset order, can be sent to fill the other leg(s) of the spread and offset the created position. A long position is one where a trader has purchased a tradeable object at a specific price with the intent of selling that tradeable object at a higher price. A short position is one where the trader has effectively sold the tradeable object first with the intent of buying it later at a lower price.

The automated spread trading tools typically allow a trader to adjust and control price levels at which offset orders are sent. However, the existing offsets are user-configurable and remain static unless a trader changes the entered values. To profit in electronic markets, market participants must be able to assimilate large amounts of data, and must react to the received data more quickly than other competing market participants. Thus, it is desirable to offer tools that can assist a trader in trading in an electronic trading environment, and help the trader make trades at the most favorable prices in a speedy and accurate manner.

BRIEF DESCRIPTION OF THE DRAWINGS

Example embodiments are described herein with reference to the following drawings, in which:

FIG. 5 is a block diagram illustrating two example market depth snapshots corresponding to the tradeable objects A and B that will be used to illustrate the use of offsets;

FIG. 6 is a block diagram illustrating a spread configuration window;

FIG. 7 is a block diagram illustrating a conditional pay-up tick configuration window that can be used by a trader to configure conditional pay-up ticks; and FIG. 8 is a flowchart illustrating a method for trading a spread according to one example embodiment.

DETAILED DESCRIPTION

I. Conditional Pay-Up Ticks Overview

It is beneficial to offer tools that can assist a trader in trading in an electronic trading environment. The example embodiments, among other things, are directed to trading a trading strategy, such as a spread. One example method includes using a first pay-up tick value to determine a first acceptable price level for an order, such as an offset order, associated with a spread. The first pay-up tick can then be automatically modified to a second pay-up tick in response to detecting a predefined condition. The predefined condition, as will be described in greater detail below, can be based on market data corresponding to one or more tradeable objects of the spread, or yet some other data, such as news. The method further includes using the second pay-up tick value to determine a second acceptable price level for the offset order. Additional details related to the methods will be described in greater detail below.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

Figure 1:
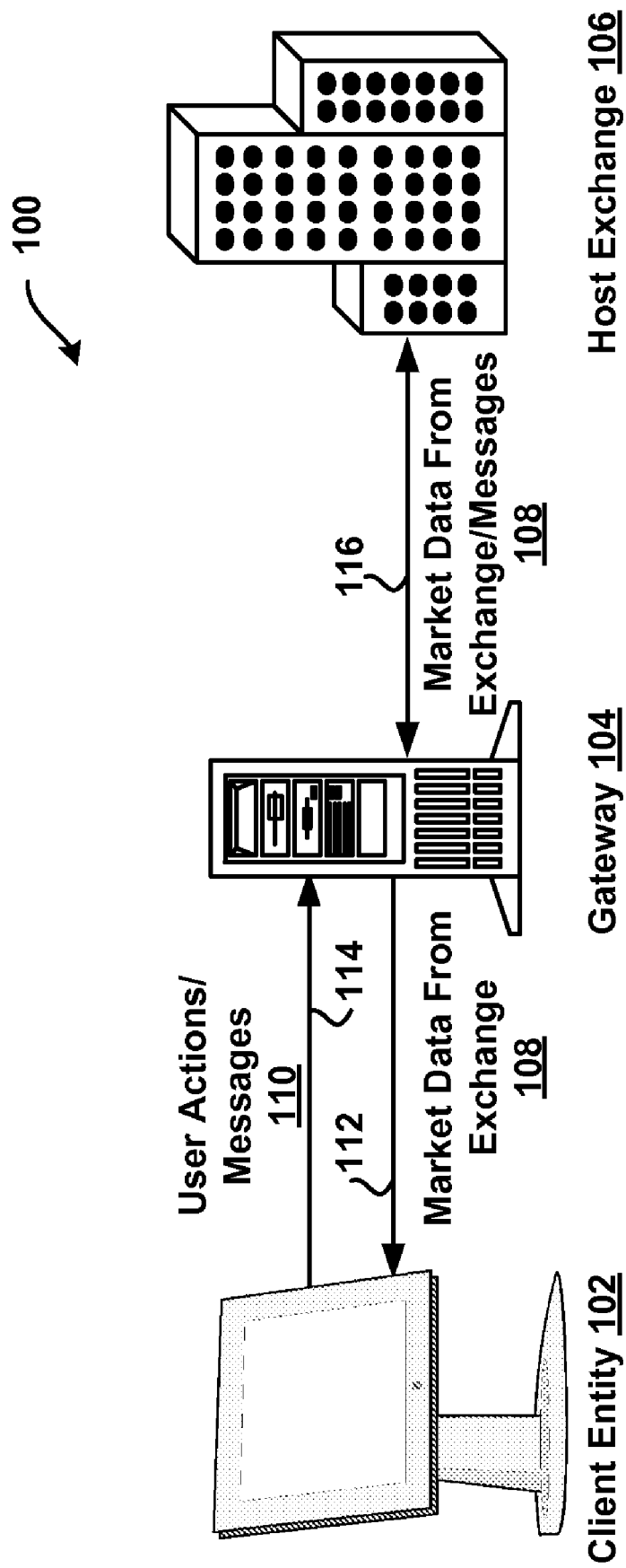
FIG. 1 is a block diagram illustrating an example network configuration for a communication system utilized to access one or more exchanges.

In an electronic trading environment, when an authorized trader selects a tradeable object, the trader may access market data related to the selected tradeable object(s). Referring to FIG. 1, an example communication that might occur between an electronic exchange and a client entity in accordance with the example embodiments is shown. During a trading session, market data 108, in the form of messages, may be relayed from a host exchange 106 over communication links 116 and 112 to a client entity generally indicated as 102. The client entity 102 may be a single client terminal that is used by a single trader or multiple client terminals corresponding to multiple traders associated with one or more trading groups. The client entity 102 may include any computer that accesses one or more networks. For example, the client entity 102 can be a personal computer, a laptop computer, a hand-held device, and so on.

As illustrated in FIG. 1, intermediate devices, such as gateway(s) 104, may be used to facilitate communications between the client entity 102 and the host exchange 106. It should be understood that while FIG. 1 illustrates the client entity 102 communicating with a single host exchange 106, in an alternative embodiment, the client entity 102 could establish trading sessions to more than one host exchange. Also, it should be understood that information being communicated to and from the client entity 102 and the exchange 106 could be communicated via a single communication path.

The market data 108 contains information that characterizes the tradeable objects, including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client entity 102. Upon viewing the market information or a portion thereof, a trader may wish to take actions, such as send orders to an exchange, cancel orders at the exchange, or change order parameters, for example. To do that, the trader may input various commands or signals into the client entity 102. Upon receiving one or more commands or signals from the trader, the client entity 102 may generate messages that reflect the actions taken, generally shown at 110. It should be understood that different types of messages or order types can be submitted to the host exchange 106, all of which may be considered various types of transaction information. Once generated, user action messages 110 may be sent from the client entity 102 to the host exchange over communication links 114 and 116.

The client entity 102 may use software that creates specialized interactive trading screens on the client entity 102. The trading screens enable traders to enter and execute orders, obtain market quotes, and monitor positions. The range and quality of features available to the trader on his or her screens varies according to the specific software application being run. In addition to or in place of the interactive trading screens, the client entity 102 may run automated non-interactive types of trading applications.

A commercially available trading application that allows a user to trade in systems like those shown in FIG. 1 and subsequent figures is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments described herein are not limited by the type of terminal or device used, and are not limited to any particular type of trading application. Portions of the X_TRADER™) and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

Figure 2:
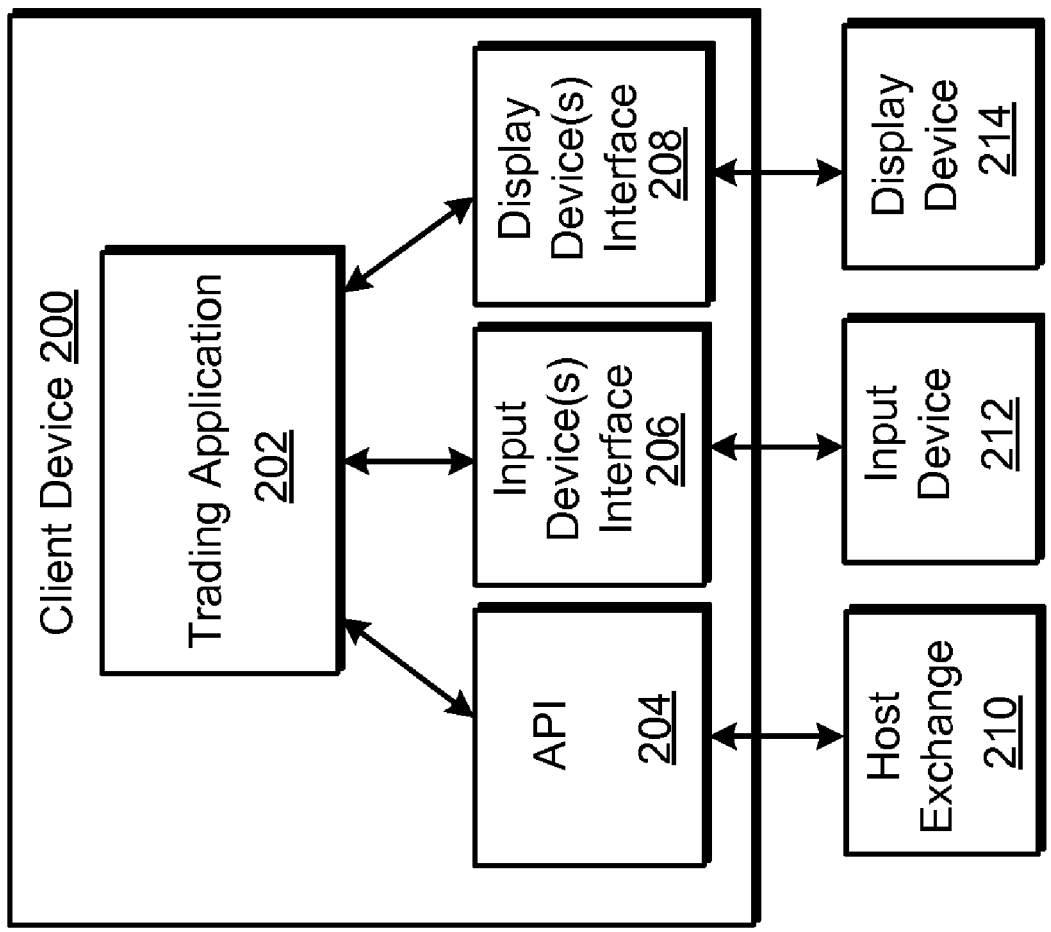
FIG. 2 is a block diagram illustrating an example embodiment of a system for providing trading information.

FIG. 2 shows an overview of client device 200 which is similar to the type of client device 102 shown in FIG. 1. Client device 200 can be any particular type of computing device, examples of which were enumerated above with respect to the client device. According to one example embodiment, client device 200 has trading application 202 stored in memory that when executed arranges and displays market information in many particular ways, usually depending on how the trader prefers to view the information. Trading application 202 may also implement an automated or semi-automated trading tool such as the automated spread trading tool that automatically sends orders into underlying legs to achieve a spread. Additionally, the preferred embodiments for regulating the trading tools may be part of trading application 202. Preferably, trading application 202 has access to market information through API 204 (or application programming interface), and trading application 202 can also forward transaction information to exchange 210 via API 204. Alternatively, API 204 could be distributed so that a portion of the API rests on the client device 200 and a gateway, or at the exchange 210. Additionally, trading application 202 may receive signals from input device 212 via input device interface 206 and can be given the ability to send signals to display device 214 via display device interface 208.

Alternatively, the example embodiments described herein may be a separate program from trading application 202, but still stored in memory and executed on client device 200. In another alternative embodiment, the preferred embodiments may be a program stored in memory and executed on a device other than client device 200. Example devices may include a gateway or some other well known intermediary device.

II. Automatic Spread Trading Overview

The example embodiments describe conditional pay-up ticks that can be used by an automated spread trading tool to place orders based on spreads in an exchange order book. However, as pointed out earlier, the example embodiments described herein are not limited to automated spread trading tools, and could be applied in relation to different trading tools having order entry systems that can determine prices for orders to be placed in the market. For example, another type of trading tool that has an automated order entry system and may benefit using the preferred embodiments is described in U.S. patent application Ser. No. 10/284,584, filed on Oct. 31, 2002 and entitled, "System and Method for Automated Trading," the contents of which are incorporated herein by reference. Also, the example embodiments are not limited to spreads, and could be easily applicable in relation to different trading strategies as well. One skilled in the art may readily adapt the example embodiments to work with this type of automated trading tool, or yet some other type of trading tool or trading strategies, using the teachings described herein.

To assist in understanding how an automated spread trading tool might work, a general description is provided below. However, an automated spread trading tool and its functions are described in greater detail and may be referenced in an already incorporated U.S. patent application Ser. No. 10/137,979, filed on May 3, 2002 and entitled, "System and Method for Performing Automatic Spread Trading."

According to one embodiment of an automated spread trading tool, a trader can select two or more individual tradeable objects underlying the spread, referred to herein as "legs" of the spread. The automatic spread trading tool preferably generates a spread data feed based on information in the legs and based on spread setting parameters, which are configurable by a user. The spread data feed is communicated to a graphical user interface manager where it is displayed in a spread window, and where data corresponding to the legs of the spread may be displayed as well. At the terminal, the user can enter orders in the spread window, and the automated spread trading tool will automatically work the legs to achieve, or attempt to achieve, a desired spread. The spread is sometimes referred to herein as a synthetically created spread or a synthetic spread.

Figure 3:
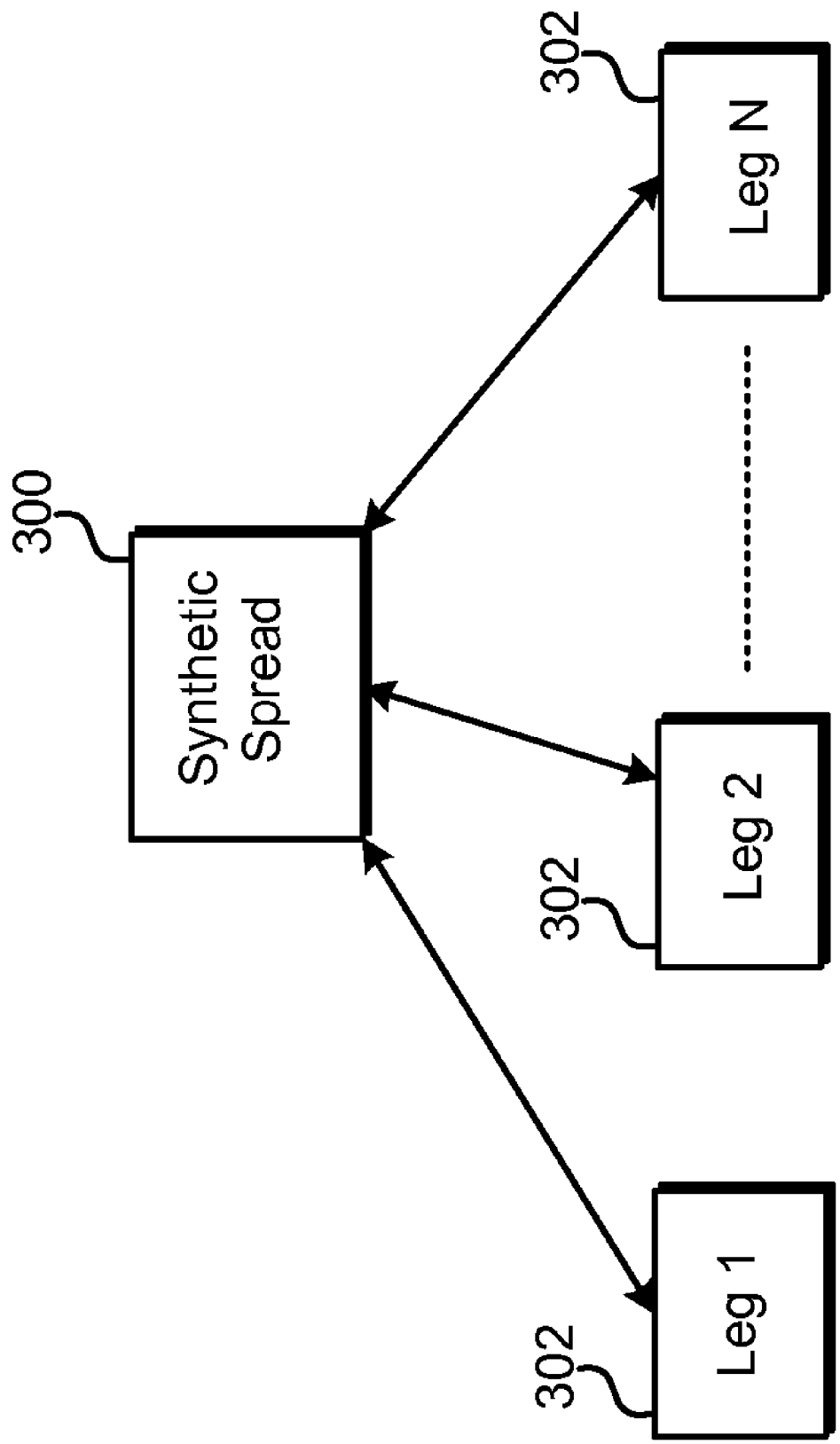
FIG. 3 is a block diagram illustrating an example relationship between a synthetically created spread and its underlying legs.

FIG. 3 illustrates the relationship between a synthetically created spread 300 and its underlying "N" legs 302, where N can be any number greater than 1. For example, a spread might have two legs, three legs, four legs, and so on. Generation of the spread 300 may be based on relationships that exist between the legs 302. Some relationships which might be used are described in the above incorporated U.S. patent application Ser. No. 10/137,979. Also, one skilled in the art of trading may have their own relationships which they prefer to use. It is not necessary to know these relationships, however, to understand the preferred embodiments.

Figure 4:
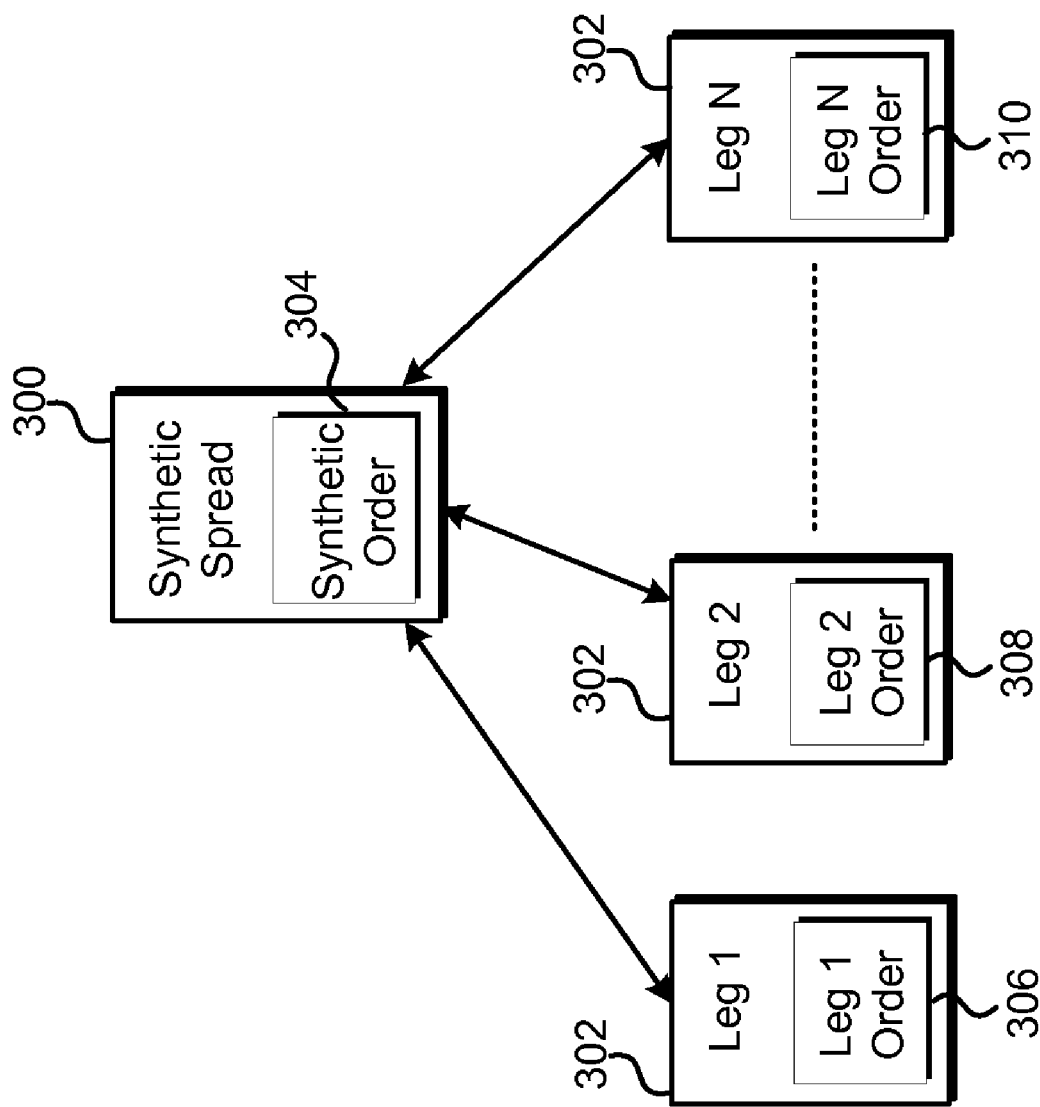
FIG. 4 is a block diagram illustrating an example relationship between a synthetically created spread and its underlying legs of FIG. 3 after a spread order is placed.

FIG. 4 illustrates the same relationship between spread 300 and its underlying legs 302 as in FIG. 3, except that a spread order 304 has been placed. When a trader enters an order to buy or to sell the spread (e.g., spread order 304) in a synthetic market, the automated spread trading tool automatically places orders in the appropriate legs to achieve or attempt to achieve the desired spread 304. For example, to achieve spread order 304, the automated spread trading tool may automatically enter orders 306, 308 . . . 310 into the underlying legs 302 (e.g., "Leg 1," "Leg 2," . . . "Leg N"). The automated spread trading tool may, among other things, calculate the quantities and prices for the orders 306, 308, 310 based on market conditions in the other legs and one or more parameters. For example, according to one trading strategy, consider if "Leg 1 Order" 306 is a buy order, then the price of order 306 may be based on the best bid price of "Leg 2" and on the best bid price of each leg through "Leg N." Of course, depending on the trading strategy, the price of order 306 might be based only on some of the legs and not on all N legs. Alternatively, other trading strategies may be used to determine the price and quantities of the orders. For example, the price of buy order 306 may be determined based on the best ask price of "Leg 2" and on the best ask price of each leg through "Leg N" (or on only some of the N legs). Of course, the order parameters of an order in one leg can be based on other types of market conditions in the other legs such as the last traded price (LTP), the last traded quantity (LTQ), a theoretical value, or some other reference point.

According to the example embodiments, as the market conditions for each leg move, an effective spread order price may be calculated. For example, if market conditions for "Leg 1" change, then an effective spread order price associated with order 304 may be determined to reflect the new market conditions. Similarly, if market conditions for "Leg 2" change, then an effective spread order price associated with order 304 may be determined. Using a conventional automated spread trading tool, if the effective spread order price is different from the desired spread order price, then the automated spread trading tool would move or re-price the leg orders in an exchange order book to maintain the desired spread order price. In particular, the leg order(s) would be deleted from the exchange, and new leg order(s) would be sent to the exchange to maintain the desired spread price. There are other ways to change an order which may provide similar results, such as sending a change order request message to an exchange at which the order was placed, etc.

Alternatively, effective prices of spread orders can be calculated continuously. For example, the effective spread order prices can be calculated every second or yet using some other time interval. According to this alternative approach, it is not necessary to monitor changes in market conditions before an effective spread order price is calculated. Similarly to the above embodiment, however, using a conventional automated spread trading tool, if the effective price of the spread order is different from the desired price of the spread order, then the automated spread trading tool would move or re-price the leg orders in the exchange order book to maintain the desired spread price being sought.

In an alternative embodiment, rather than calculating an effective spread order price, the automated spread trading tool could calculate effective prices of orders in each leg of the spread. In particular, as the market conditions for each leg move, the effective prices of orders in the other legs may be calculated such that the desired spread price being sought by the trader can be maintained. For example, if market conditions for "Leg 1" change, then the effective prices of orders based on the market conditions in "Leg 1," such as order 308 through order 310 may be calculated to maintain the spread. If market conditions for "Leg 2" change, then the effective prices of orders based on market conditions in "Leg 2," such as order 306 through order 310 may be calculated to maintain the spread. Further, to maintain the desired spread price being sought, using a conventional automated spread trading tool, if the effective prices of the leg orders are different from the prices of the leg orders, then the automated spread trading tool would move or re-price the leg orders in an exchange order book. In particular, the leg order(s) would be deleted from the exchange, and a new leg order(s) at the effective price would be sent to the exchange.

Also, in another alternative embodiment, the effective prices of orders in the other legs can be continuously calculated such that the desired spread price being sought by the trader can be maintained. For example, the effective leg order prices can be calculated every second or yet at different time intervals. Using this alternative approach, it is not necessary to monitor changes in market conditions before the effective leg prices are calculated. Similarly to the above embodiment, however, to maintain the desired spread price being sought, using a conventional automated spread trading tool, if the effective prices of the leg orders are different from the prices of the leg orders, then the automated spread trading tool would move or re-price the leg orders in the exchange order book.

A. The Use of Offset Orders

According to one example configuration of the spread, when an order associated with one leg of a spread is filled, an "offset" order is preferably sent to fill the other leg(s) at either the market price or as a limit order with pre-defined "pay-up ticks." A market order is a bid order or an ask order that is executed at the best price currently available in the market. In one example embodiment, the best prices may be those prices nearest to the inside market, where the inside market is the highest bid price and the lowest ask price for the tradeable object being traded for which there is quantity in the market. A limit order is executed at a specific price as dictated by the trader, regardless of whether it is the best price and/or regardless of whether there is sufficient quantity available for an immediate fill.

In one example embodiment, the user may configure the automatic spreader to use either of these two offset techniques, but alternatively, other offset techniques known in the art of trading could be implemented as well. In one example embodiment, a trader may set up spread order parameters using a spread configuration window. The spread configuration window may include an "Offset With" field, and the field may be used to determine whether quantities are entered as market orders or limit orders. In such an embodiment, the "Offset With" field may enable a trader to select either 'market orders' or 'limit orders.' When the 'market orders' are selected, then quantities will be entered into the market as market orders. If the "Offset With" field is set to 'limit orders,' then quantities will be entered as limit orders. The spread configuration window could also include a 'Pay-up Tick' field, and the trader could use the 'Pay-up Tick' field to define the number of ticks that a trader is willing to pay beyond the basis of the limit price to complete a spread, or in other words an acceptable range of prices for the offset order. In one example embodiment, the basis price of the limit order may be based on a price that will achieve the desired spread. Alternatively, the basis price for limit orders could be based on the inside market (either the best offer in the case of a bid or the best bid in the case of an offer).

Using pay-up ticks, to establish the price of the limit order, the pay-up tick value is added to the basis for a buy order and subtracted from the basis of the sell order. In other words, the pay-up ticks allow a trader to set a level of tolerance with respect to the filling of an additional order. In one example embodiment, this tolerance can be defined by a user specifying a number of ticks. Also, as will be described in greater detail below, this tolerance may be set dynamically based on user-defined conditions.

i. Example 1

Quoting One or Two Legs with Offset Based on Market Orders

For example, when quoting one leg of a two-legged spread, after the working order is filled in the quoted leg, the automatic spreader can send an offset market order to fill the other leg. If the automatic spreader is quoting both legs of a two-legged spread, after one of the working orders in one of the legs is filled, the automatic spreader may send an offset market order to the other leg and then may attempt to delete the working order that was being quoted in the other leg. If some or all of that working order's quantity gets filled before it can be deleted, in one example embodiment, the automatic spreader may send a corresponding offset market order to the other leg. This situation is commonly referred to as a double fill scenario. Alternatively, the automatic spreader can be set to first delete the working order being quoted in the other leg before sending the offset market order. Different embodiments are possible as well.

When a partial quantity is filled in one of these legs, the spread ratio settings are preferably used to determine the quantity of the offsetting order that is sent into the second leg's market. For example, suppose a trader is working a 10-by-30 spread, where 1:3 corresponds to a spread ratio. Let's now assume that a trader places a first order having an order quantity of 10 at an electronic exchange. Let's now assume that two of the 10 working quantity are filled on the first leg (20% of the working quantity). An equal percentage (20%) of the offset quantity may be sent into the market for the second leg. For the above example, a quantity of six (20% of 30—determined based on 1:3 ratio) would be sent into the second leg's market, and the quantity of the spread would be adjusted based on the partially filled quantity. If the quantity (or spread units) are not whole numbers, the automatic spreader can round up/down or truncate the quantity, depending on how it is programmed.

ii. Example 2

Pay-Up Ticks

Let's assume that a trader is working a spread for tradeable objects A and B, and buys the actively quoted quantity for tradeable object A, and consequently now wants to sell tradeable object B in order to complete the spread, or, in other words, offset the position established in relation to the tradeable object A. FIG. 5 shows two example market depth snapshots corresponding to the tradeable objects A and B. Now, let's assume that the desired spread value can be achieved by buying tradeable object A at a price of 109300, so that the price of 109300 is the basis for calculating the limit order. Let's also assume that the "Pay-up Tick" field for that leg contains a value of 0. According to such configuration, a limit order will be entered at a price of 109300, which is the equivalent to the basis price plus zero ticks. It should be understood that the pay-up ticks can be used in relation to a minimum price movement, as defined by the exchange, in a tradeable object. However, a tick can also refer to a larger or smaller amount than the minimum price movement. For example, the minimum price movement in a eCBOT for the ten year future is 0.5 tick.

Then, consequently, if the buy order fills in relation to the tradeable object A, an offsetting order, here the sell order for the tradeable object B can be automatically entered at the calculated price. Let's now assume that the auto-spreader can achieve a spread by selling tradeable object B at the best bid, and a pay-up tick is set to 1. In such an embodiment, the auto-spreader will submit the sell order for the tradeable object B at the price of 111260, which is the best bid price corresponding to the market price of the tradeable object B minus 1 tick. If there is sufficient quantity available to complete the spread at a price of 111260 or higher, that quantity may be filled immediately. If no such quantity is available, the limit order will not immediately be filled, but may instead remain entered at 111260 until sufficient quantity becomes available. In addition, if the trader sets the "Pay-up Tick" value to 1, and a limit order is entered at a price that is 1 ticks from the basis price, but quantity is available at a price better than where the limit order was entered, the order may get filled at that better price. The "Pay-up Tick" feature therefore puts a limit on how far away from the basis price determined for a spread order the trader is willing to allow an offset order or any spread order to be filled.

According to the example embodiment described above, using positive pay-up ticks, the auto-spreader offsets orders on a bid-to-bid or ask-to-ask basis, which means, for example, in relation to a buy order entered for one leg on a bid side of the market, that the sell order for the other leg will also be entered on the bid side of the market corresponding to the second leg. However, there could be times when a trader may wish to achieve a bid-to-ask or ask-to-bid spread, such that, for example, when placing a buy order in relation to one leg on a bid side of the first market, the sell order will be entered on the ask side of the second market, or vice versa. A trader could achieve such a configuration by defining negative pay-up ticks. Referring back to FIG. 5, let's assume that the auto-spreader places a buy order in relation to the tradeable object A at a price of 109300, and the sell order of the tradeable object B is configured with a negative pay-up tick of −1. Now, let's assume that based on the spread configuration, the sell order is to be entered at the best bid price in the market corresponding to the tradeable object B. However, using the negative pay-up ticks, the auto-spreader will modify the price corresponding to the sell order, and will enter the sell order at 111270, the best bid 111265 minus (negative 1 tick), which is 111265 plus 1 tick, thus submitting the order on the ask side.

III. Conditional Pay-Up Ticks

According to example embodiments that will be described in greater detail below, the auto-spreader application could allow a trader to define and use conditional pay-up ticks. Using conditional pay-up ticks, a trader could define pay-up tick value(s) to be used in relation to one or more legs of the spread, and the auto-spreader could dynamically change the pay-up tick value(s) based on, and upon detecting, any user-defined conditions. For example, when one or more conditions apply, the auto-spreader application could switch from using positive or zero pay-up ticks to using negative pay-up ticks, or vice versa. Alternatively, different values corresponding to positive or zero pay-up ticks and negative pay-up ticks could be applied to spread orders based on applicable conditions. It should be understood that many different conditions could be used, such as market related conditions, trader-performance based conditions, or yet some other conditions that are based on data from outside sources, such as news, or certain numbers, such as announcement of unemployment numbers. For example, one or more conditions that can be used to dynamically change values for pay-up ticks could be based on market volatility. In such an embodiment, a higher pay-up tick value could be used upon detecting a highly volatile market (where the market volatility could be defined by the user as well), and a lower pay-up tick value or no pay-up tick value could be used upon detecting a non-volatile market. The conditions could also be based on one or more equations including a plurality of user-defined variables.

According to one example embodiment, a user could configure conditions as well as values to be used in relation to pay-up ticks via an external interface, such as a spreadsheet. In such an embodiment, a user could easily change any variables and values associated with the conditions and pay-up tick via the spreadsheet. However, it should be understood that different applications, other than spreadsheets, could be used as well to configure and change conditions and the corresponding pay-up tick values. It should be understood that any desirable data exchange protocol could be used to embed information from the third party software, such as a spreadsheet, to the auto-spreader application or to another graphical user interface that is used to define conditions to be used by the auto-spreader application. For example, when the Microsoft Windows is used as the third party software, Microsoft OLE 2.0 may be used to perform these functions. Microsoft OLE 2.0 may be used to provide a link between any filter condition and one or more cells from a Microsoft EXCEL spreadsheet. Data exchange protocols as well as embedding and linking techniques are well known to those skilled in the art. It should be understood that when an equation is used to define a condition, every time a value of one of the equation variables changes, the spreadsheet application or any other third party software may dynamically calculate a new value to be used in relation to determining pay-up tick values.

It should be understood that an individual user could uniquely set conditions and pay-up tick values to suit his or her individual trading strategies. A trader could program the conditions and applicable pay-up tick values in a variety of ways and at any time, such as before trading or on the fly. Alternatively, a system administrator who oversees a number of traders may set up a number of conditions and associated pay-up tick values for a group of traders or for individual traders. In such an embodiment, when a trader in that group inputs a new order, the auto-spreader can monitor data associated with the conditions, and then dynamically apply pre-configured pay-up tick values to the spread orders based on the applicable conditions.

FIG. 6 is a block diagram illustrating a spread configuration window 600. The spread configuration window 600 shows a spread having two legs 602. However, it should be understood that any number of legs can be added to the spread while configuring the spread using the configuration window 600. Preferably, the spread configuration window 600 has many spread setting parameters that can be set by a user to customize the spread. As such, the spread setting parameters may control the behavior of the spread as it is generated, displayed, and traded, depending on the particular parameter.

The "Spread Name" 602 provides the name of the spread and/or the names of underlying tradeable objects being traded as a spread, e.g., TTSIM-D FGBL SEP06 and TTSIM-D FGBL DEC 06. The legs of the spread are also displayed in the "Leg" fields 610. Also, a trader could personalize the spread by renaming the spread and/or the legs to have any desired name. The spread window 600 also includes "Inside Slop" and "Outside Slop" parameters 604. The Inside Slop and Outside Slop parameters prevent continuous re-quoting of working orders associated with the spread, and indicate the point at which the working bids/offers will be readjusted in the market to satisfy the spread value. The "Leg Color ID" parameter 606 allows a trader to use the color selector to identify working spreads and corresponding leg orders in the trading interface. As will be described in greater detail below, a trader could also select specific colors or specific graphical indicators to be used in relation to spread orders that were generated using conditional pay-up ticks. The "Base Spread On" parameter 608 allows a trader to select a set of prices to be used for trading spreads. As shown in FIG. 6, when the "Implied Spread Prices" are selected, the trading interface for trading the specified spread will display the actual implied prices of the spread. Then, if the "Net Change" is selected, the trading interface will display the spread prices as a net change from a previous settlement price, or yet some other prices specified by a trader.

The "Customer Account" field 612 allows a trader to access the customer account for use in relation to trading the spread.

The "Active Quoting" 614 enables a trader to select a leg of the spread that the auto-spreader will quote in. If the checkbox is not selected, the auto-spreader will send an order for the unselected leg when the other leg is filled. However, alternatively, it should be understood that the auto-spreader could simultaneously quote in both legs as well. When the "Adjust for Market Depth" 616 is checked, the auto-spreader will use market depth to calculate spread pricing. If the "Adjust for Market Depth" 616 is unchecked, the pricing for the spread may be adjusted based on the best bid/offer in the market. The "Offset With" field 618 allows a trader to define a type of orders to be used in relation to offset orders. As shown in FIG. 6, the offset orders could be limit orders. However, different order types could be used as well, such as market orders, for instance.

The "Pay-up Ticks" fields 620 can be used in conjunction with the "Offset With" filed 618 when the limit orders are selected. The "Pay-up Ticks" fields 620 allow a trader to select two different types of pay-up ticks. According to one embodiment, the pay-up ticks could be static, and a trader could select this type of pay-up ticks by defining values in relation to the "Numerical" fields in the Pay-up Ticks field 620. The numerical values defined for the static pay-up ticks could be positive or negative. The spread configuration window 600 also allows a trader to enable conditional pay-up ticks that could be used in relation to one or more legs of the spread. When the conditional pay-up ticks are selected, another graphical interface, such as the one illustrated in FIG. 7 can be automatically activated to enable a trader to define conditions as well as other settings to be used in relation to conditional pay-up ticks. It should be understood that a trader could both, the static pay-up ticks, as well as the conditional pay-up ticks. In such an embodiment, static pay-up ticks could be used in relation to spread orders until one or more selected conditions associated with the conditional pay-up ticks are satisfied.

The "Spread Ratio" parameter 622 indicates the quantity ratio of each spread leg in relation to other legs. A negative sign (−) before a number in the "Spread Ratio" field may indicate a short leg. The "Spread Multiplier" parameters 624 may be used to equate the cash value of inter-product spreads in order to calculate the spread value. When the "Use Cancel/Replace rather than Change" field 626 is enabled, the auto-spreader will send a cancel/replace orders rather than attempting to change the pending orders. The "Price Reasonability Check in Leg" field may be used to enable the auto-spreader to check price-reasonability on a leg before the trade is submitted to an exchange. Such functionality may be required for certain exchanges before a trade is accepted in the market. While the spread configuration window 600 shows the parameters described above, it should be understood that different parameters could be defined as well in relation to the spread.

FIG. 7 is a block diagram illustrating a conditional pay-up tick configuration window 700 that can be used by a trader to configure conditional pay-up ticks. The graphical interface 700 can be automatically activated when a trader selects a "Conditional" selection box in the "Pay-Up Ticks" fields 620 of the spread configuration window 600 in FIG. 6. The configuration window 700 includes "Spread Leg" fields 702, "Select Conditions" fields 704, "Add New Conditions" fields 706, "Create/Link Equations" fields 708, "Quantity Ratio" fields 710, "Minimum Quantity" fields 712, and "Pay-up Tick" value fields 714. When the pay-up tick configuration window 700 is activated, the leg fields 702 can be automatically populated using leg names from the spread configuration window 600. While FIG. 7 illustrates two legs of the spread, it should be understood that the example embodiments are not limited to spreads having only two legs.

As shown in FIG. 7, a trader could enter different pay-up tick configurations in relation to each leg of the spread. A user can use the "Select Condition" field 704 to select a condition that will be used to activate the conditional pay-up tick values. For example, a condition could be based on market volatility, and different conditions could be created for different levels of market volatility. Also, while a user may select a single condition using the "Select Condition" field 704, the selected condition may be associated with more than one sub-condition, the satisfaction of which may trigger activation of the corresponding condition. Also, it should be understood that a user could select multiple conditions to be used during a trading session. In such an embodiment, different pay-up tick values could be used depending on which condition is triggered.

The "Create/Modify Condition" field 706 can be used to define new conditions or to specify/modify certain parameters associated with the currently existing conditions. For example, a pull down menu could be provided in relation to the "Create/Modify Condition" field 706 to enable selection or creating of a new condition or modifying the existing conditions. However, different selection options could be provided as well. Once a user selects one of the options, one or more other interfaces could be activated, and the interface(s) could be used to create new conditions or to modify certain parameters of the existing conditions. For example, in relation to conditions that are based on market volatility, a user could create conditions corresponding to new market volatility levels, or modify market volatility levels corresponding to the existing conditions. The market volatility levels could be defined based on how many ticks the market moves per second, or yet based on some other definitions.

According to one example embodiment, some conditions could be based on one or more equations. The "Create/Link Equation" field 708 allows a trader to create equations or link them from other applications. It should be understood that a trader could also link any set of instructions or a computer program via the "Create/Link Equation" field 708 to be used as a condition. Different configurations are possible as well.

In addition to defining conditions, a user could define other parameters that could also be used in the process of determining if the conditional pay-up ticks should be activated. For example, the additional parameters could be based on current market conditions, such as the quantity available in the market. According to one example embodiment illustrated in FIG. 7, a user could configure a quantity ratio using the "Quantity Ratio" fields 710, and a minimum quantity using the "Minimum Quantity" fields 712. As shown in FIG. 7, a user could enable/disable each function for the respective legs of the spread using selection boxes 716, 720, and 724, 728. Then, values for the quantity ratios and minimum quantities could be defined via the fields 718, 722, 726, and 730. As an example, lets assume that a trader sets the quantity ratio to 2.5 and the minimum quantity to 100. In this case, if the tradeable object is an offsetting tradeable object to be bought, then the best ask/best bid quantity ratio would have to be 2.5 or higher, and the best ask quantity needs to be greater than 100.

Finally, when one or more conditions and/or parameters are selected, a trader could define pay-up tick values via the "Pay-Up Tick Value" fields 714. Alternatively, when a trader selects a condition, the "Pay-Up Tick Value" fields 714 could be automatically populated with the preconfigured values corresponding to the selected condition(s). According to one example embodiment, a trader could define and activate both the statically defined numerical pay-up ticks and conditional pay-up ticks so that the statically defined numerical pay-up ticks can be used until one or more selected conditions are met. Similarly, when the conditions are no longer satisfied, the auto-spreader application can automatically revert back to using statically defined numerical pay-up ticks. For example, a trader may wish to configure static pay-up ticks to use positive pay-up tick values, and then use negative pay-up ticks when one or more conditions are satisfied.

According to one example embodiment, a trader may submit and view working order indicators via a trading interface, such as the MD Trader™-style display described in U.S. Pat. No. 6,772,132, and incorporated by reference above. According to one example embodiment, when conditional pay-up ticks are activated and used to generate an offsetting order, a working order indicator that appears in the trading interface, or in relation to some other interface, may be displayed with a distinct color, shape, or yet some other distinguishing characteristic, so that a trader can have a visual confirmation of the conditional pay-up tick action. While visual representation for offsetting orders that were generated using conditional pay-up tick values is one possible implementation, a trader could also select a distinct sound to be played when conditional pay-up tick order is placed. It should be understood that a trader could configure different colors and/or sounds to be used in relation to different conditions.

FIG. 8 is a flowchart illustrating a method for trading a spread according to one example embodiment. It should be understood that each block in this and subsequent flowcharts may represent a module, segment, or portion of code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the present invention.

Referring to FIG. 8, at step 802, a condition is defined to be used in relation to a spread. According to one example embodiment, the condition can be defined by a trader. However, the condition could be selected automatically from a pool of user-defined conditions, while the automatic selection of the specific condition could be time-based. The condition could define one or more parameters to be monitored, and when the defined parameters are detected, the condition can be consequently triggered.

At step 804, the auto-spreader uses a first pay-up tick value in relation to spread orders. The first pay-up tick value can be used to determine a first acceptable price level or range for one or more orders related to the spread, and the selection of orders in relation to which the first pay-up tick value is used may depend on user-configuration. The first pay-up tick value can be positive, negative, or zero.

At step 806, the condition is detected based on monitoring of data associated with the defined condition. It should be understood that different applications in communication with the auto-spreader can be used to monitor data associated with the conditions and to detect when the condition is activated. Alternatively, the auto-spreader can be used to perform this function.

At step 808, upon the condition is detected, the first pay-up tick value is automatically modified to a second pay-up tick value. Then, the second pay-up tick value can be used to determine a second acceptable price level for one or more spread orders.

It will be apparent to those of ordinary skill in the art that methods involved in the system and method for using conditional pay-up ticks in relation to spread orders or yet some other orders generated by the automatic or semi-automatic applications may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for trading a tradeable object, comprising:
   receiving a pay-up tick value via an input device associated with a processor;
   automatically modifying the pay-up tick value to a modified pay-up tick value according to a predefined condition via the processor, where at least one parameter of the predefined condition is user-configurable; and
   determining a price for at least one order of a trading strategy via the processor, the price being determined according to the modified pay-up tick value.

2. The method of claim 1 where the trading strategy comprises a spread trading strategy.

3. The method of claim 1 where at least one parameter of the predefined condition is determined according to market data associated with the trading strategy.

4. The method of claim 1 where the predefined condition comprises a user-defined equation.

5. The method of claim 1 further comprising determining a first price range for the at least one order according to the pay-up tick value.

6. The method of claim 5 further comprising determining a second price range for the at least one order according to the modified pay-up tick value, where the price is within the second price range.

7. The method of claim 1 where the order comprises an offset order.

8. A method for trading a tradeable object, comprising:
   receiving a pay-up tick value for a trading strategy via a client device;
   detecting a predefined condition via the client device;
   in response to detecting the predefined condition, automatically modifying the pay-up tick value to a modified pay-up tick value, where at least one parameter of the predefined condition is user-configurable; and
   determining a price of at least one order of a trading strategy according to the modified pay-up tick value via the client device.

9. The method of claim 8 where the trading strategy comprises a spread.

10. The method of claim 8 further comprising determining a first price range for the at least one order according to the pay-up tick value.

11. The method of claim 10 further comprising determining a second price range for the at least one order according to the modified pay-up tick value, the price being within the second price range.

12. The method of claim 8 where the at least one order comprises an offset order.

13. The method of claim 8 where the at least one order comprises a hedge order.

14. The method of claim 8 where the predefined condition is based on at least market data.

15. A computer readable medium having instructions stored thereon that when executed by a processor cause the processor to carry out the steps comprising:
   receiving a pay-up tick value via an input device associated with a processor;
   automatically modifying the pay-up tick value to a modified pay-up tick value according to a predefined condition via the processor, where at least one parameter of the predefined condition is user-configurable; and
   determining a price for at least one order of a trading strategy via the processor, the price being determined according to the modified pay-up tick value.

16. The method of claim 15 where at least one parameter of the predefined condition is determined according to market data associated with the trading strategy.

17. The computer readable medium of claim 15 where the predefined conditions comprises a user-defined equation.

18. The computer readable medium of claim 17 where the steps further comprise determining a second price range for the at least one order according to the modified pay-up tick value, where the price is within the second price range.

* * * * *